Sept. 1, 1964 H. R. BOTEFUHR 3,146,809
ADJUSTABLE GUIDE PLATE FOR JIG SAWS
Filed April 6, 1961 2 Sheets-Sheet 1
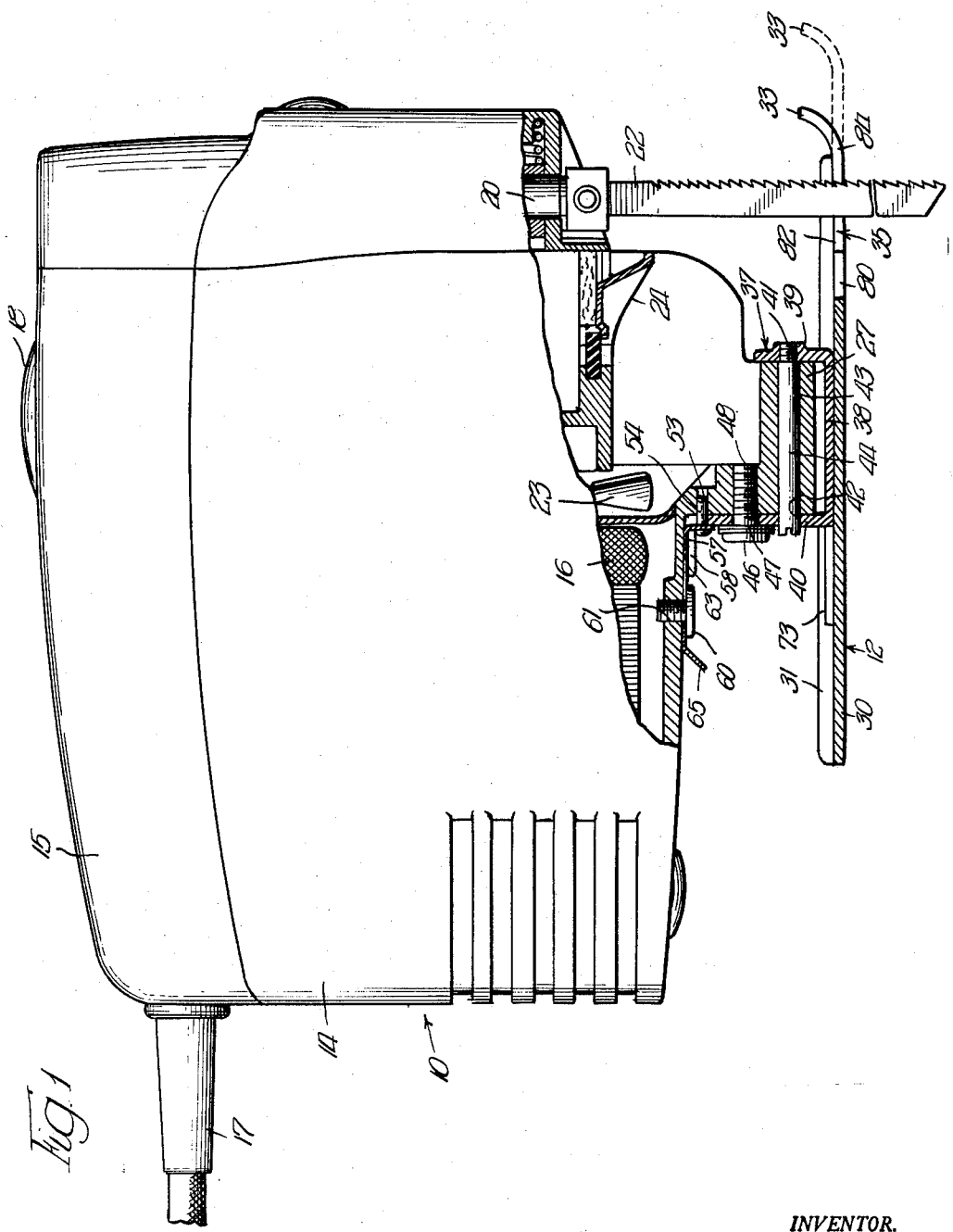
INVENTOR.
Harold R. Botefuhr,
BY
Cromwell, Greist & Warden
ATTYS.

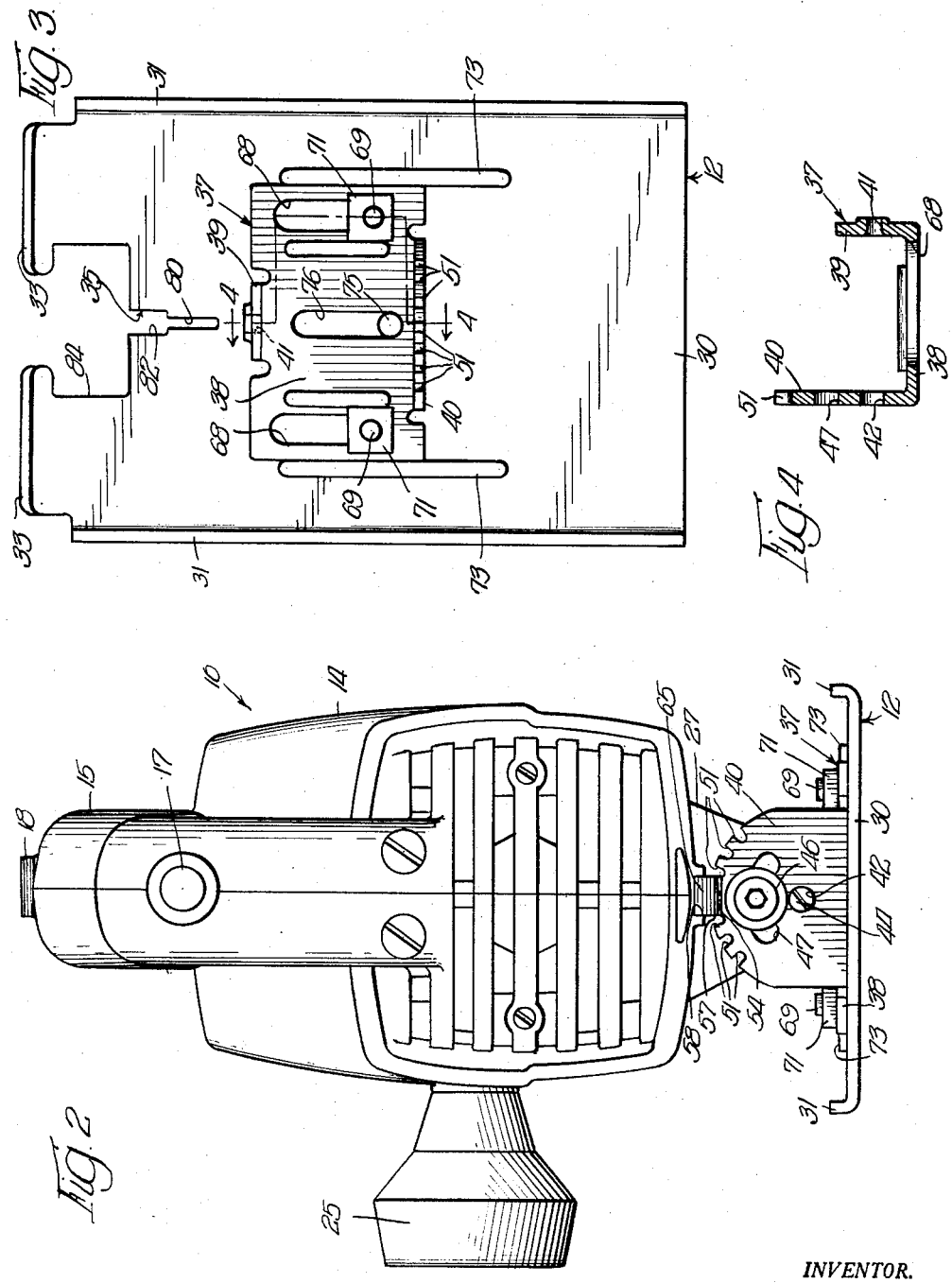

United States Patent Office 3,146,809
Patented Sept. 1, 1964

3,146,809
ADJUSTABLE GUIDE PLATE FOR JIG SAWS
Harold R. Botefuhr, Bensenville, Ill., assignor to Skil Corporation, Chicago, Ill., a corporation of Delaware
Filed Apr. 6, 1961, Ser. No. 101,244
5 Claims. (Cl. 143—68)

The present invention relates to hand operable power tools and, more particularly, to an adjustable guide plate for portable power jig saws and the like.

An important object of the present invention is to provide a hand operable power jig saw having a new and novel saw blade guide plate which is both longitudinally adjustable forwardly and rearwardly of the jig saw housing and pivotably adjustable about a longitudinal axis disposed slightly above the center line of the guide slot formed therein.

Another important object of the present invention is to provide a jig saw having a new and improved adjustable guide plate of the character described wherein the guide slot in the plate is provided with longitudinally spaced portions of varying widths with the narrowest width portion being at the rear end of the slot and being adapted for guidingly accommodating hollow ground saw blades for fine-finish cutting operations and with the forward portions of the slot having progressively larger widths and being adapted for guidingly accommodating set type saw blades for rougher high-speed cutting operations.

Another object of the present invention is to provide a jig saw having a new and novel saw blade guide plate of the character described with latch means being provided for positively locking the guide plate in any one of a number of predetermined angular positions relative to the saw blade whereby to permit cutting material at an angle to the surface thereof which is engaged by the guide plate.

Another object of the present invention is to provide a jig saw having a new and novel saw blade guide plate of the character described whereby the guide plate may be readily adjusted to guidingly accommodate saw blades of most types in a manner tending to combat twisting and lateral vibration of such blades so as to substantially reduce chipping of the material being cut, whereby the jig saw may be used for either fine-finish cutting operations or for rougher high-speed cutting operations, and whereby the jig saw may be used to cut material at an angle to the surface thereof which is engaged by the guide plate.

Certain other objects of the invention will, in part, be obvious, and will in part appear hereinafter.

For a more complete understanding of the nature and scope of the invention reference may now be had to the accompanying drawings wherein:

FIG. 1 is a side elevational view, partially in vertical section, of a hand operable power jig saw provided with an adjustable guide plate embodying the invention;

FIG. 2 is a rear end elevational view of the jig saw of FIG. 1;

FIG. 3 is a top plan view of the guide plate and the mounting bracket therefor; and FIG. 4 is a vertical section through the mounting bracket taken generally on the line 4—4 of FIG. 3.

A hand operable power jig saw 10 provided with a new and novel adjustable saw blade guide plate 12 embodying the invention is best illustrated in FIGS. 1 and 2. The jig saw 10 is of the general type including a housing 14 the upper portion of which is narrowed to provide a handgrip 15, an electric motor 16, a power cord 17, a switch 18 for the motor 16, a tool holder 20 mounted in the housing 14 for generally vertical reciprocating movement and operably connected to the drive shaft of the motor 16 by any of the suitable drive connections known in the art whereby during operation of the motor 16 the tool holder 20 is reciprocated in a generally vertical direction, a generally vertically disposed saw blade 22 secured in a known manner at its upper end to the lower end of the tool holder 20 for vertical reciprocation therewith, a fan blade 23 mounted on the drive shaft of the motor 16, and an air passage 24 which communicates with the portion of the housing 14 in which the fan blade 23 is located. A second handgrip 25 which projects from one side of the housing 14 is shown in FIG. 2. The underside of the housing 14 is characterized by a depending portion 27 from which the guide plate 12 is suspended.

The saw blade guide plate 12, which is best illustrated in FIGS. 1 and 3, comprises a generally flat plate member 30 having upstanding side edges 31 and a forward end portion which is slightly curved upwardly, as at 33. The forward portion of the guide plate 12 is provided with a longitudinally extending guide slot 35 having a longitudinal center line disposed substantially midway between the upstanding side edges 31 of the plate member 30. The guide slot 35 will be more fully described hereinafter. The saw blade 22 is vertically reciprocal through the guide slot 35 during a cutting or sawing operation with the undersurface of the guide plate 12 being engageable with the upper surface of the material being cut and with the portions of the guide plate 12 adjacent the guide slot 35 serving to hold down the material being cut inasmuch as the cutting operation occurs during the upward stroke of the saw blade 22.

The saw blade guide plate 12, which is spaced below the underside of the housing 14 of the jig saw 10, is attached thereto by a U-shaped bracket 37 which is characterized by a flat base portion 38 and by front and rear upstanding arm portions 39 and 40, respectively. The bracket 37 is pivotally connected to the depending portion 27 of the housing 14 in a manner which will now be described. The bracket 37 is fitted over the depending housing portion 27 with the upstanding front arm 39 thereof being disposed against the front surface of the depending housing portion 27 and with the upstanding rear arm 40 thereof being disposed against the rear surface of the depending housing portion 27. A threaded bore 41 which is formed in the front arm 39 and a bore 42 which is formed in the rear arm 40 are aligned with a generally horizontal longitudinally extending bore 43 which is formed in the depending housing portion 27. A pivot pin 44 which extends through the aligned bores 42, 43 and 41 and has its forward end threadedly tightened in the bore 41 of the front arm 39 is freely rotatable in the bore 43 formed in the depending housing portion 27 whereby the U-shaped bracket 37 is pivotal relative to the depending housing portion 27 about the axis of the bore 43 formed therein.

A threaded fastener member 46 extends freely through an arcuate slot 47 which is formed in the upstanding rear arm 40 of the bracket 37 above the bore 42 therein and is threadedly received in a bore 48 which is formed in the rear surface of the depending housing portion 27. The ends of the arcuate slot 47 serve to limit the pivoting movement of the U-shaped bracket 37 relative to the depending housing portion 27.

Provision is made for positively locking the U-shaped bracket 37 in a series of angular positions relative to the depending housing portion 27. As best illustrated in FIG. 2, the upper edge of the upstanding rear arm 40 of the bracket 37 defines an arc of a circle having the axis of the bore 42 as its center. This arcuate upper surface is provided with a series of circumferentially and angularly spaced open recesses 51. The rear surface of the depending housing portion 27 is provided with a locking bore 53 which is spaced vertically above the bore 42 a distance which is equal to the radius of the arc of the upper surface of the rear upstanding arm 40 of the bracket 37 whereby during pivoting movement of the bracket 37, the recesses 51 formed in the upper surface of the rear arm 40 thereof are successively rotated into alignment with the locking bore 53. A locking pin 54 is adapted to be inserted through whichever one of the recesses 51 in the upstanding rear arm 40 of the bracket 37 is aligned with the locking bore 53 and into locking engagement in the locking bore 53 whereby to positively lock the U-shaped bracket 37 in any one of a series of angular positions relative to the depending housing portion 27. The locking pin 54 projects forwardly from the downwardly turned front end portion of a bracket 57 which is longitudinally slidable in a groove 58 which is provided on the underside of the housing 14 immediately to the rear of the depending housing portion 27. The bracket 57 is slidably retained in the groove 58 formed in the underside of the housing 14 by means of a fastener member 60 which is threadedly received in a bore 61 provided in the bottom wall of the housing 14 and which passes through a longitudinally extending slot 63 formed in the bracket 57 whereby to accommodate forward and rearward sliding movement thereof. The rear end of the bracket 57 is bent downwardly and rearwardly to provide a readily grippable handle 65 for the bracket 57 whereby to facilitate locking and unlocking movement of the locking pin 54.

The saw blade guide plate 12 is adjustably attached to the base portion 38 of the U-shaped bracket 37 in a manner permitting longitudinal adjustment of the guide plate 12 forwardly and rearwardly of the bracket 37 whereby saw blades may be reciprocated through the guide slot 35 at the inner rear end thereof, at the outer front end thereof, or at any point therebetween. The flat base portion 38 of the U-shaped bracket 37 is provided with a pair of parallel laterally spaced longitudinally extending slots 68 formed adjacent the opposite side edges thereof. A pair of rigid upstanding fastener members or studs 69 which are arranged in laterally spaced relationship on the plate member 30 of the guide plate 12 rearwardly of the guide slot 35 thereof project upwardly one through each of the elongated slots 68 when the upper surface of the guide plate 12 is disposed against the undersurface of the base portion 38 of the bracket 37 in properly aligned relationship therewith. The upper end of each of the upstanding threaded fasteners 69 is provided with a releasable tightening nut 71. When the nuts 71 are in a loosened condition, the guide plate 12 may be longitudinally adjusted forwardly and rearwardly of the bracket 37 after which the nuts 71 are adapted to be tightened whereby to retain the guide plate 12 in its longitudinally adjusted position relative to the U-shaped bracket 37.

A pair of laterally spaced longitudinally extending upstanding guide ribs 73 are provided on the upper surface of the guide plate 12 for guiding engagement with the opposite side edges of the flat base portion 38 of the U-shaped bracket 37. To provide additional guide means for the guide plate 12 during longitudinal adjustment thereof relative to the bracket 37, an upstanding pin 75 located on the longitudinal center line of the guide plate 12 is guidingly engageable in a centrally located longitudinally extending slot 76 formed in the flat base portion 38 of the bracket 37.

The saw blade guide plate 12 is not only longitudinally adjustable forwardly and rearwardly of the U-shaped bracket 37 but it is also pivotal with the bracket 37 about the center line of the bore 43 in the depending housing portion 27 as an axis, which axis is disposed parallel and slightly above the longitudinal center line of the guide slot 35, whereby to adjustably position the guide plate 12 in a series of angular positions relative to the saw blade 22 which is reciprocal through the guide slot 35. This pivotal adjustment feature of the guide plate 12 permits cutting or sawing material at angles less than 90° to the surface of the material which is engaged by the underside of the guide plate 12. It is noted that when the guide plate 12 is disposed in its rearmost position relative to the bracket 37 that the saw blade 22 is disposed in the forwardmost portion of the guide slot.

In jig saw blades, the teeth on the cutting edge thereof are shaped in a manner that they cut the material during the upward stroke of the blade whereby the material being cut is pulled against the undersurface of the guide plate during the upward cutting stroke of the blade. One universal disadvantage of jig saws is that the surface of the material engaged by the underside of the guide plate tends to chip as a result of the saw teeth pulling upwardly therethrough. The extent of this chipping depends upon the kind of material being cut and the type of saw blades being used, that is, hollow ground or set type blades. This chipping is also emphasized or increased as a result of lateral vibration of the cutting blade during the upward cutting stroke. By providing the guide slot in a guide plate as narrow as possible while still being wide enough to accommodate a saw blade which is reciprocal therethrough, the problem of chipping may be minimized inasmuch as the narrowness of the guide slot serves to substantially reduce lateral vibration and twisting of the saw blades.

The guide plates on most jig saws are provided with uniform width guide slots in the forward ends thereof. Such guide slots must therefore be wide enough to accommodate set type saw blades which are widely used for relatively rough high speed cutting operations. For fine-finish cutting operations, hollow ground saw blades are normally used as they are substantially narrower in lateral width than the set type saw blades and the saw teeth thereof are generally in alignment rather than being alternately off-set in opposite lateral directions. Thus, using a hollow ground saw blade with a jig saw having a guide plate provided with a guide slot adapted to accommodate a relatively wider set type saw blade tends to defeat the purpose for using the hollow ground blade inasmuch as the guide slot is too wide to effectively prevent lateral vibration and twisting of the hollow ground blade. This problem could be solved by providing separate jig saws having guide plates with different width guide slots therein or by providing separate replaceable guide plates having different width guide slots for use with either set type blades or hollow ground blades. This solution, however, would be highly impractical from a cost standpoint and it would also be time consuming and inconvenient to have to change guide plates periodically. Another method that has been used in an attempt to solve this problem has been to provide separate small insert members which are engageable in the standard width guide slots but which have narrower guide slots formed therein to accommodate hollow ground blades. The main disadvantages of this arrangement are that the small separate insert members are easily lost or misplaced and also that such an arrangement requires that there must be some play between the insert and the standard guide plate in order to permit ready assembly and disassembly thereof, which play, of course, is objectionable.

A practical and highly effective solution to the problem is provided by the present invention in the form of the improved self-contained guide plate 12 which is adapted for use with either hollow ground or set type saw blades and the novel adjustable mounting thereof, which solution negates the necessity of providing separate guide plates or insert members therefor. As is best illustrated in FIG. 3, the guide slot 35 of the forwardly and rearwardly adjustable guide plate 12 is characterized by longitudinally spaced portions 80, 82 and 84 of varying widths. The inner rear end portion 80 of the guide slot 35 is narrowest in width and is adapted to guidingly accommodate hollow ground saw blades for vertical reciprocation therethrough for fine-finish cutting operations, the guide plate 12 being disposed in its forwardmost longitudinal position relative to the U-shaped mounting bracket 37. The guide slot portion 82 which is disposed immediately forward of the guide slot portion 80 is somewhat larger in width and is adapted to accommodate set type saw blades for vertical reciprocation therethrough for rougher high speed cutting operations. For such cutting operations, the guide plate 12 is adjustably positioned in an intermediate longitudinal position whereby the set type saw blades will be reciprocal through the slot portion 82. The next forward portion 84 of the guide slot 35 is substantially larger in width and is adapted to accommodate saw blades for vertical reciprocation therethrough when the guide plate 12 is pivoted and latched in an angular position relative to the saw blade. A substantial width is provided for the slot portion 84 inasmuch as the axis about which the guide plate 12 is pivoted is spaced slightly above the longitudinal center line of the guide slot 35.

In operation, when the jig saw 10 is to be used for a fine-finish cutting operation at right angles to the material to be cut, a hollow ground blade is mounted in the tool holder 20 after which the guide plate 12 is positively latched in its angular position normal to the saw blade and is longitudinally adjusted into its forwardmost position whereby the saw blade extends downwardly through the narrowest guide slot portion 80. If the jig saw 10 is to be used for a rougher high-speed cutting operation at right angles to the material to be cut, a set type saw blade is mounted in the holder 20, after which the guide plate 12 is latched in its angular position normal to the saw blade and is longitudinally adjusted into an intermediate position whereby the set type saw blade extends downwardly through the guide slot portion 82. If the jig saw 10 is to be used for a cutting operation wherein the material is to be cut at an angle less than 90° to the surface thereof which is engaged by the underside of the guide plate 12, a suitable saw blade is mounted in the holder 20 after which the guide plate 12 is longitudinally adjusted into a position whereby the saw blade extends downwardly through the widest guide slot portion 84. Then, the guide plate 12 is pivotally adjusted into the desired angular position relative to the saw blade after which the locking pin 54 is positively engaged in the locking bore 53.

It will be understood that certain changes may be made in the construction or arrangement of the adjustable guide plate for jig saws disclosed herein without departing from the spirit and scope of the invention as defined in the appended claims.

I claim:

1. In a hand operable power jig saw including a housing, a motor mounted therein, a saw blade extending downwardly from the underside of the housing and mounted for reciprocal movement in a generally vertical direction, and means operably connecting the motor to the saw blade for reciprocating the same, the improvement which comprises, a guide plate spaced below the underside of the housing and having a longitudinally extending guide slot provided in the forward end thereof approximately midway between the side edges of the guide plate with the saw blade being reciprocal through said guide slot, said slot having longitudinally spaced portions of varying widths with the inner rear end portion of the slot having the smallest width and being adapted for guidingly accommodating hollow ground saw blades adapted for fine-finish cutting operations and with the forward portions of said slot having progressively larger widths and being adapted for guidingly accommodating set saw blades for rougher high-speed cutting operations, a pair of parallel laterally spaced longitudinally extending upstanding ribs provided on the upper surface of said guide plate rearwardly of the slot formed therein, a U-shaped bracket suspended from the underside of the housing and having a flat base portion disposed against the upper surface of said guide plate between said upstanding ribs thereon with said ribs being slidably engageable with the opposite side edges of said base portion, a pair of parallel longitudinally extending slots formed adjacent the opposite side edges of said base portion, and a pair of upstanding studs on said guide plate extending upwardly through said slots and having releasable tightening nuts on the upper ends thereof whereby said guide plate may be adjustably moved forwardly and rearwardly in a longitudinal direction relative to said bracket whereby a saw blade may be selectively reciprocated through any one of the varying width portions of said slot in said guide plate.

2. In a hand operable power jig saw including a housing, a motor mounted therein, a saw blade extending downwardly from the underside of the housing and mounted for reciprocable movement in a generally vertical direction, and means operably connecting the motor to the saw blade for reciprocating the same, the improvement which comprises, a guide plate spaced below the underside of the housing for engagement with the surface of the material to be cut, said guide plate having a longitudinally extending guide slot provided in the forward end thereof approximately midway between the side edges of the guide plate with the saw blade being reciprocable through said slot normally at right angles to said guide plate, said guide slot having at least two longitudinally spaced portions of varying widths with the inner portion having the smaller width, a horizontally disposed longitudinally extending pivot pin mounted in a depending portion of the housing and being disposed slightly above said guide plate, a U-shaped bracket having a flat base portion attached to the upper surface of said guide plate and upstanding front and rear arm portions mounted, respectively, on the front and rear ends of said longitudinally extending pivot pin whereby said guide plate is pivotable about the axis of said pivot pin into angular positions relative to said reciprocable saw blade, thus permitting the cutting of material at an angle to the surface thereof which is engaged by said guide plate, at least the other of said portions of said slot in said plate being of sufficient width to accommodate the reciprocable saw blade when said guide plate is disposed at an angle thereto, and releasable means for positively locking said guide plate in a plurality of predetermined angular positions.

3. In a hand operable power jig saw including a housing, a motor mounted therein, a saw blade extending downwardly from the underside of the housing and mounted for reciprocable movement in a generally vertical direction, and means operably connecting the motor to the saw blade for reciprocating the same, the improvement which comprises, a guide plate spaced below the underside of the housing for engagement with the surface of the material to be cut, said guide plate having a longitudinally extending guide slot provided in the forward end thereof approximately midway between the side edges of the guide plate with the saw blade being reciprocable through said slot normally at right angles to said guide plate, means suspending said guide plate from the underside of the housing in a manner permitting pivoting movement of said plate about an axis disposed parallel to and spaced slightly above the longitudinally extending center line of said slot whereby the saw blade may be reciprocated through said slot at angles less than 90° to said plate, said slot having longitudinally spaced portions of varying widths with the rear end portion of the slot having the smallest width and being adapted for guidingly accommodating hollow ground saw blades adapted for fine-finish cutting operations, with the immediately adjacent forward portion of said slot having a larger width and being adapted for guidingly accommodating set saw blades for rougher high-speed cutting operations, and with the forwardmost portion of said slot having a still larger width and being adapted for accommodating a saw blade when said guide plate is pivoted into an angular position relative to the saw blade, and said guide plate being longitudinally adjustable forwardly and rearwardly of said suspending means whereby a saw blade may be selectively reciprocated through any one of the varying width portions of said slot in said guide plate.

4. In a hand operable power jig saw including a housing, a motor mounted therein, a saw blade extending downwardly from the underside of the housing and mounted for reciprocable movement in a generally vertical direction, and means operably connecting the motor to the saw blade for reciprocating the same, the improvement which comprises, a guide plate spaced below the underside of the housing for engagement with the surface of the material to be cut, said guide plate having a longitudinally extending guide slot provided in the forward end thereof approximately midway between the side edges of the guide plate with the saw blade being reciprocable through said slot normally at right angles to said guide plate, a horizontally disposed longitudinally extending pivot pin rotatably mounted in a depending portion of the housing and being disposed slightly above said guide plate, a U-shaped bracket having a flat base portion and upstanding front and rear arm portions mounted, respectively, on the front and rear ends of said longitudinally extending pivot pin whereby said bracket is pivotable about the axis of said pivot pin, a pair of parallel longitudinally extending slots formed adjacent the opposite side edges of said base portion of said bracket, a pair of upstanding studs on said guide plate extending upwardly through said slots in the base portion of said bracket and having releasable tightening nuts on the upper ends thereof, said arrangement of parts permitting both pivoting movement of said guide plate and said bracket about the axis of said pivot pin whereby to position said plate at various angles to the saw blade reciprocable through the slot therein and forward and rearward longitudinal adjustment of said guide plate relative to said bracket whereby the saw blade may be selectively reciprocated through any portion of said slot between the front and rear ends thereof, said guide slot in said plate having longitudinally spaced portions of varying widths with the rear end portion of the slot having the smallest width and being adapted for guidingly accommodating hollow ground saw blades adapted for fine-finish cutting operations, with the immediately adjacent forward portion of said slot having a larger width and being adapted for guidingly accommodating set saw blades for rougher high-speed cutting operations, and with the forwardmost portion of said slot having a still larger width and being adapted for accommodating a saw blade when said guide plate is pivoted into an angular position relative to the saw blade, and a releasable latch device for positively locking said guide plate in any one of a number of predetermined angular positions relative to a saw blade.

5. In a hand operable power jig saw including a housing, a motor mounted therein, a saw blade extending downwardly from the underside of the housing and mounted for reciprocable movement in a generally vertical direction, and means operably connecting the motor to the saw blade for reciprocating the same, the improvement which comprises, a guide plate spaced below the underside of the housing for engagement with the surface of the material to be cut, said guide plate having a longitudinally extending guide slot of varying width provided in the forward end thereof approximately midway between the side edges of the guide plate with the saw blade being reciprocable through said slot normally at right angles to said guide plate, means suspending said guide plate from the underside of the housing in a manner permitting both pivoting movement of said plate about an axis disposed parallel to and spaced slightly above the longitudinally extending center line of said slot whereby the saw blade may be reciprocated through the widest portion of said slot at angles less than 90° to said plate and longitudinal adjusting movement of said plate forwardly and rearwardly relative to the housing between a forwardmost position in which the saw blade is vertically reciprocal in said inner rear end portion of said guide slot and a rearwardmost position in which the saw blade is reciprocal in the forwardmost portion of said guide slot, whereby the saw blade may be selectively reciprocated through any portion of said slot between the front and rear ends thereof, and releasable means for positively locking said guide plate in any one of a series of predetermined angular positions.

References Cited in the file of this patent
UNITED STATES PATENTS

| | | |
|---|---|---|
| 996,329 | Habig | June 27, 1911 |
| 1,542,127 | Hastings | June 16, 1925 |
| 1,707,097 | Ruschke | Mar. 26, 1929 |
| 2,547,922 | Bechtold | Apr. 10, 1951 |
| 2,695,522 | Papworth | Nov. 30, 1954 |
| 2,854,043 | Raymond | Sept. 30, 1958 |
| 2,949,944 | Blachly | Aug. 23, 1960 |

FOREIGN PATENTS

| | | |
|---|---|---|
| 585,297 | Great Britain | Feb. 4, 1947 |